Dec. 8, 1964     R. A. HESS     3,160,527
FUEL CELL
Filed May 31, 1960
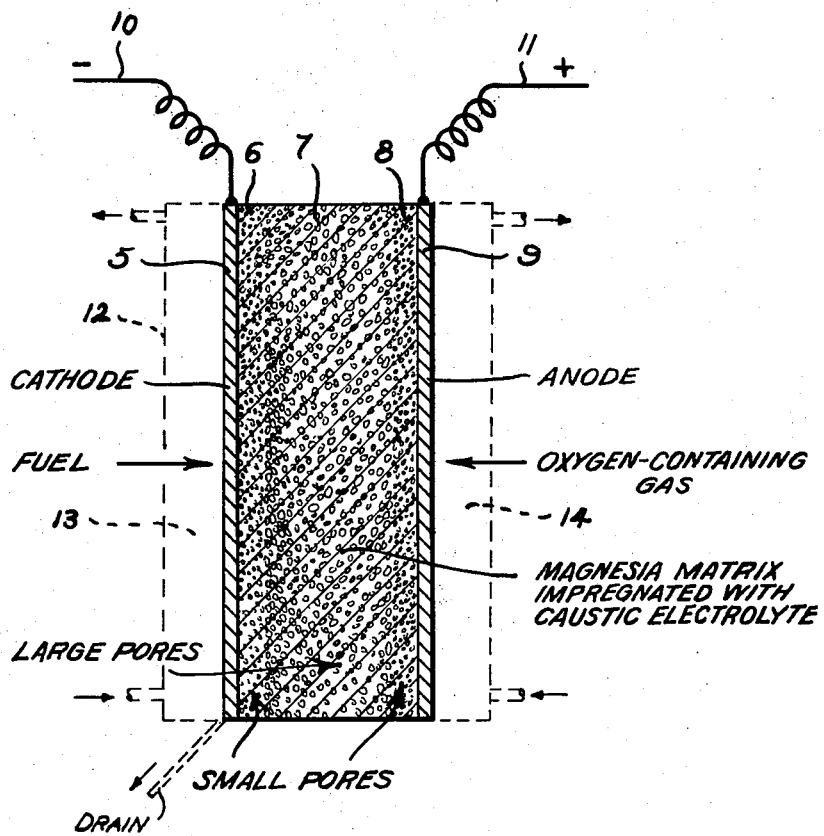
INVENTOR.
*Richard A. Hess*
BY
ATTORNEY.

3,160,527
FUEL CELL
Richard A. Hess, Claymont, Del., assignor, by direct and mesne assignments, of one-half to Air Products and Chemicals, Inc., a corporation of Delaware, and one-half to Northern Natural Gas Company, Omaha, Nebr., a corporation of Delaware
Filed May 31, 1960, Ser. No. 32,696
11 Claims. (Cl. 136—86)

This invention relates to fuel cells in general, and is directed not only to the fuel cell unit as a whole, but also to the usual components thereof, such as the porous matrix which is placed between the fuel and oxygen electrodes to contain the alkaline electrolyte, or even the porous supports which contain suitable catalytic material and form the catalytic electrodes of the cell. The invention is concerned with both improvements in the cell structure itself and its components and improvements in the method of forming the same.

In a co-pending joint application Serial No. 32,598, entitled Porous Contact Mass and Method of Making Same, filed concurrently herewith in the names of James E. McEvoy and Harold Shalit, there is disclosed a method for making a contact mass comprising fired magnesium oxide, which mass has such a high degree of structural strength, porosity, and alkali-resistance as to render it especially suitable for use, among other things, as a fuel cell component, that is, either as a matrix to contain the alkaline electrolyte or as a catalytic electrode support.

In accordance with the disclosed method of such co-pending application, the hard magnesium oxide mass is prepared by first mixing pre-fired magnesium oxide powder, of a particle size ranging, for example, from 20 to about 100 mesh, with reagent grade raw magnesium oxide and then wetting the paste with diluted nitric acid to form an easily extrudable or moldable mixture. Such mixture, when formed into a body of the desired shape, dried at a low temperature, and then fired at a temperature in the range of about 1800 to 2500° F., forms a strong porous contact mass or support.

In accordance with the present invention the method of the aforesaid co-pending application is advantageously utilized in the formation of a unitary fuel cell body, which may be cast, molded or otherwise shaped into a single unit comprising not only the matrix for containing the fuel cell electrolyte, but also the anode and cathode electrodes of the cell. In the formation of the single unitary structure of the fuel cell the electrical conductors leading from the anode and cathode electrodes are affixed thereto or embedded in the mix during the formation of the cell so that good electrical contact is assured.

In a preferred method of carrying out the invention a smooth paste is formed by admixing reagent grade, raw magnesium oxide and pre-fired magnesium oxide, both of relatively fine powder size, such as 200 mesh and finer, with a stoichiometric amount of diluted reagent nitric acid. To separate portions of this paste are added quantities of catalytic materials suitable to catalyze the chemical reactions occurring respectively at the fuel and oxygen electrodes of the cell. The catalytic materials may comprise transition metals, such as platinum, palladium and nickel, or silver and may be admixed with the magnesium oxide paste in the form of finely divided metal powder, or may be impregnated therein by being applied as salts of the metal, such as in the form of chloroplatinic acid, palladium chloride, silver nitrate, etc. Such paste of finely divided magnesium oxide particles forms the electrode paste for the fuel cell, one portion containing the catalyst desired at the cathode or fuel electrode, and the other portion containing catalyst desired at the anode or oxygen electrode. Alternatively, however, the powdered catalytic material may be omitted from the paste and may be applied later to the outer faces of the completed cell in the form of a metallic salt solution which will be adsorbed throughout the electrode portions of the cell.

One portion of the electrode paste is placed as a thin bottom layer in a shallow mold. One end of an electrical conductor, such as a wire or ribbon of copper, silver, platinum, etc., is placed in contact with the paste near the edge of the mold, good electrical contact being assured by first saturating the paste in the terminal area of contact with an excess of the active metal powder. This shallow layer is then overlaid with a thicker layer or layers of a matrix paste comprising coarser particles of reagent grade, raw magnesium oxide and pre-fired magnesium oxide admixed with diluted reagent nitric acid in the manner employed in making the electrode paste. Although the overlay of matrix paste may be a single layer containing magnesium oxide particles in the size range of about 20–200 mesh, it is preferred that the particle size, and thus the eventual pore size of the matrix, increase gradually toward the center of the matrix. This is accomplished by first depositing on the bottom electrode layer a layer of matrix paste composed of magnesium oxide particles of about 100–200 mesh, then a second matrix layer composed of particles of about 20–60 mesh, and then a third matrix layer of the 100–200 mesh paste. This completes the matrix portion of the fuel cell.

The other electrical conductor is placed on top of the matrix, or of the third or final matrix layer, as the case may be, and the terminal area of contact and the electrical conductor are coated with an excess of the active metal powder or catalyst employed in the remaining portion of the electrode paste.

The final thin layer of electrode paste is placed on top of the matrix and the entire mass within the mold is pressed firmly to assure good interface bonding of the layers. The molded article of magnesium oxide paste is thoroughly dried at moderate drying temperature, such as about 135° C., and is then fired in a reducing atmosphere, such as hydrogen, at a temperature of about 1800–2500° F. to decompose the nitrate component and obtain optimum reduction of the metals or salts. The drying and/or firing may be carried out while the magnesium oxide paste is still in the mold, or the molded cell may be removed from the mold for drying and firing. The consistency of the paste is preferably such that the molded paste article may be handled with reasonable care without crumbling or breaking while removing the same from the mold and transferring it to the drying or firing zone.

The completed article is a hard porous body in the form of a disc or plate comprising a middle matrix layer or region having relatively large pores and outside electrode layers having relatively small pores. The matrix is integrally bonded to the electrode to form a rigid, sturdy fuel cell element which needs only to be encased in a suitable housing having a confining wall surface spaced from the outer face of the cathode electrode to form a fuel chamber and spaced from the outer face of the anode electrode to form an oxygen chamber.

For a clearer understanding of the invention, reference may be had to the accompanying drawing forming a part of this application and illustrating one form of the invention. The drawing shows a cross-sectional elevation of the integral electrode-matrix element and diagrammatically shows by broken lines a suitable housing element which may form with the molded component the fuel and oxygen chambers of the completed fuel cell.

In the drawing, the cathode portion 5 is integrally bonded to the outer, small-pore region 6 of the matrix portion 7. To the opposite small-pore region 8 of the matrix 7 there is integrally bonded the anode electrode 9. An electrical conductor 10 is connected to the cathode 5 and an electrical conductor 11 is connected to the anode 9.

The entire magnesium oxide mass is encased in a housing 12, diagrammatically illustrated by broken lines, thus providing a fuel chamber 13 and an oxygen chamber 14. Ports communicating with the chambers 13 and 14 are provided, as diagrammatically shown. The alkaline electrolyte is introduced into the matrix portion 7 of the cell and is held within the pores of the matrix.

In a typical fuel cell in accordance with the invention the magnesium oxide mass may be of disc or plate-like construction having a diameter or major dimension of about 4–6 inches; the electrode portions 5 and 9 may be about $1/16$–$1/8$ of an inch in thickness; and the matrix portion may be about $1/4$–$3/8$ of an inch in thickness.

As a further modification in accordance with the invention it is contemplated that where the cell construction is such that resistance to the flow of electrical current from the farthermost areas of the electrodes to the electrical conductors 10 and 11 is excessive, an expanded conductor grid, mesh or coil of metal such as silver or nickel may be embedded within the magnesium oxide mass throughout the region containing the active catalyst sites. For example, the screen may be completely embedded within the electrode portions 5 and 9 or may be embedded within the cell structure at the interface between the electrode and matrix portions. The conductors 10 and 11 would then be connected to the expanded metal conductor.

The grid or other conductor may be placed in the mold after a portion of the electrode paste has been deposited and the remaining electrode paste may be placed on top of the grid; or, the first grid may be placed in the mold between the deposition of the first portion of electrode paste and the matrix paste and the second grid may be inserted immediately before the deposition of the second portion of electrode paste.

Such expanded metal mesh or grid would, of course, have an additional useful function in that it would reinforce the entire cell body and give it increased rigidity.

Apart from its basic simplicity and its ease of fabrication the integrated electrode-matrix body of the present invention provides several distinct advantages.

The importance of porosity in both the electrode and electrolyte matrices of a low temperature fuel cell is well recognized. It is necessary for the gaseous fuel to diffuse through the porous electrode at a rate which will provide optimum fuel utilization at the active catalyst sites adjacent to the interface between the electrodes and the electrolyte. Control of the gas diffusion rate through the electrodes to the electrolyte is effected through predetermined selection of the pore size of the electrodes.

Within the electrolyte matrix the hydroxyl ions formed at the positive or oxygen electrode migrate to the negative or fuel electrode. Optimum migration rate is obtained through control of the matrix pore size in this region. The relatively large pores of the electrolyte matrix permit free movement of the hydroxyl ions between the electrodes.

In the regions of the electrolyte matrix immediately adjacent to the electrodes an intermediate pore size provides the advantage of more rapid distribution into the electrolyte of any water formed in the electrochemical reaction, thus avoiding any considerable localized dilution effect at the catalyst sites. A further advantage of larger pore size in the electrolyte matrix is that such arrangement makes fresh liquid electrolyte addition, if necessary, more simplified.

Obviously, many modifications and variations of the invention as hereinbefore set forth may be made without departing from the spirit and scope thereof, and therefore only such limitations should be imposed as are indicated in the appended claims.

What is claimed is:

1. The method of forming a hard strong porous magnesium oxide body as a composite catalytic electrode/electrolyte matrix for an alkaline fuel cell, said body having a central matrix portion of relatively large pore size adapted to contain a liquid alkaline electrolyte and outer electrode portions of substantially smaller pore size, each electrode portion containing metallic catalyst effective to promote its respective electrode reaction and to provide a conductive path for generated electric current, which method comprises the steps of: forming a dry powder mix of reagent-grade raw magnesium oxide and pre-fired magnesium oxide powders finer than about 200 mesh, U.S. Standard; adding diluted reagent nitric acid to said mix to form a moldable, pasty electrode-forming mixture; forming at least one dry powder mix of raw and pre-fired magnesium oxide powders coarser than about 200 mesh; adding diluted reagent nitric acid to each coarser mix to form a moldable pasty matrix-forming mixture; molding a multilayer composite body of said pasty mixtures comprising a relatively-thin layer of said electrode-forming mixture, at least one layer of matrix-forming mixture and a final layer of said electrode-forming mixture; partially inserting individual electrical conductors between each electrode layer and its adjoining matrix surface during said molding operation; compressing the molded composite body to assure good interface bonding of the multiple electrode and matrix layers; drying said molded body at moderate temperature; firing said molded body in a reducing atmosphere at temperatures in the range of about 1800–2500° F.; and incorporating into said outer electrode layers, prior to utilization of said composite fuel cell element, minor amounts of metallic components effective to catalyze the respective intended electrode reactions.

2. A method as in claim 1 in which said catalytic metallic components are incorporated into said electrode layers by adding the respective active metals in the form of finely-divided metal powders to separate portions of said moldable pasty electrode mixture before molding the same into said composite body.

3. A method as in claim 2 including the step of applying to the inner surfaces of said pasty electrode layers additional minor amounts of said active metal powders in the terminal areas of contact with said individual electrical conductors.

4. A method as in claim 3 in which said electrical conductors are substantially coextensive with the areas of contact between said matrix and said electrode layers.

5. A method as in claim 1 in which said catalytic metallic components are added to said electrode layers in the form of metallic salt solutions which are applied through the exposed surfaces of said electrode layers upon cooling of said composite body after said firing step and which penetrate throughout said electrode layers.

6. A method as in claim 1 in which said coarser dry powder for said moldable pastry matrix comprises a single mix having a particle size in the range of about 20–200 mesh.

7. A method as in claim 1 in which said coarser dry powder for said moldable pastry matrix comprises separate mixes, one having a particle size in the range of about 100–200 mesh and the other a particle size in the range of about 20–100 mesh; and in which said matrix portion of said composite body is formed by interposing a single paste layer of 20–100 mesh particles between two paste layers of 100–200 mesh particles.

8. A unitary catalytic electrode/electrolyte matrix body for a fuel cell comprising a hard porous plate of fired magnesium oxide characterized by a plurality of integrally bonded layers of different pore size including a central electrolyte matrix layer composed of particles of magnesium oxide in the size range of 20–200 mesh, producing relatively large pores, and outer catalytic electrode layers on either side of said electrolyte matrix layer composed of particles of magnesium oxide in the size range of 200 mesh or finer, producing pores finer than the pores in said matrix layer, said electrode layers being impregnated with catalytic material suitable to catalyze the respective cathode and anode reactions; and electrical conductors individual to said electrodes, said conductors having portions integrally embedded within said body and arranged in good electrical contact with said catalytic electrode layers.

9. A catalytic electrode/electrolyte matrix body as in claim 8 in which said electrolyte matrix layer is characterized by a central portion of 20-100 mesh particles, producing relatively large pores, and outer portions of 100-200 mesh particles, producing smaller pores intermediate in size between the pores of said central matrix portion and the pores of said catalytic electrode layers.

10. A catalytic electrode/electrolyte matrix body as in claim 8 in which said portions of electrical conductors embedded within and in good electrical contact with said electrode layers are substantially coextensive with the adjoining electrode layer and matrix layer surfaces.

11. A catalytic electrode/electrolyte matrix body as in claim 10 in which said embedded portions of said electrical conductors are in the form of metallic screens.

References Cited in the file of this patent

UNITED STATES PATENTS

| | | |
|---|---|---|
| 2,913,511 | Grubb | Nov. 17, 1959 |
| 2,914,596 | Gorin et al. | Nov. 24, 1959 |
| 2,947,797 | Justi et al. | Aug. 2, 1960 |
| 2,952,570 | Heunenckx | Sept. 13, 1960 |